United States Patent [19]

Norman et al.

[11] Patent Number: 4,483,309

[45] Date of Patent: Nov. 20, 1984

[54] FUEL-AIR CONTROL DEVICE

[76] Inventors: Juanita Norman; Dan M. Norman, both of 2132 E. 4850 S., Salt Lake City, Utah 84117

[21] Appl. No.: 495,737

[22] Filed: May 18, 1983

[51] Int. Cl.³ .................. F02M 25/06; F02M 23/04
[52] U.S. Cl. ................................ 123/574; 123/572; 123/573; 123/586
[58] Field of Search ............ 123/572, 573, 574, 41.86, 123/585, 586

[56] References Cited

U.S. PATENT DOCUMENTS

| | | | |
|---|---|---|---|
| 1,089,998 | 3/1914 | Watkins | 123/586 |
| 1,398,406 | 11/1921 | Turner | 123/574 |
| 1,954,198 | 4/1934 | Cochrene | 123/574 |
| 2,154,593 | 4/1939 | Way | 123/574 |
| 3,166,061 | 1/1965 | Weiser | 123/572 |
| 3,176,670 | 4/1965 | Sinibaldi | 123/572 |
| 3,809,035 | 5/1974 | Winton | 123/574 |
| 3,961,615 | 6/1976 | Poslek | 123/586 |
| 4,014,303 | 3/1977 | Aiti | 123/586 |
| 4,305,369 | 12/1981 | Norman | 123/572 |

FOREIGN PATENT DOCUMENTS

| | | | |
|---|---|---|---|
| 688807 | 1/1940 | Fed. Rep. of Germany | 123/586 |
| 471292 | 9/1937 | United Kingdom | 123/572 |

Primary Examiner—Ronald H. Lazarus

[57] ABSTRACT

A device for aiding in the control of the fuel-air mixture in an internal combustion engine having an accelerator linked mechanically to a carburetor and a ventilation passage from the crankcase of said engine to the intake manifold, said device comprising a valve housing having a seat coupled to an air passage adapted to communicate between outside ambient air and the ventilation passage; a valve means for seating in the seat in the valve housing to prevent ambient air from flowing into the air passage, and a rotatable valve control cam means coupled to the accelerator to gradually open and close the valve as the accelerator is depressed. This device is used to increase the air in the fuel mixture so as to provide a more complete combustion.

17 Claims, 7 Drawing Figures

FUEL-AIR CONTROL DEVICE

BACKGROUND OF THE INVENTION

This invention relates to devices used in vehicular internal combustion engines to provide efficient control and use of the crankcase fumes.

It has been known that automobile engines contribute to atmospheric pollution by spewing forth unburned and partially burned gaseous hydrocarbons and even droplets of unburned oil. A principal offender in this respect are the fumes which originate in the crankcase and which in the past were allowed to escape to the atmosphere. In recent times laws have been passed which require the fumes to be channeled back to the air intake manifold of the engine, there to be mixed to the incoming fuel-air mixture so that the unburned hydrocarbons in the fumes will be burned in the engine cylinders.

In existing automobile engines, a crankcase ventilation conduit has its intake end usually located upstream of the carburetor in such manner as to pass fresh air into the crankcase. Ventilation of the crankcase is achieved by drawing off this air and entrained fumes, gases, etc., through a conduit connected to the downstream side of the carburetor or to the air intake manifold. The crankcase fumes and ventilating air pass into the induction system downstream of the carburetor. Because of this, the flow from the crankcase to the intake manifold must be controlled. To provide such control, a pollution control valve or positive crankcase ventilation valve(PCV valve) is located in the conduit connecting the crankcase to the engine air intake manifold. The PCV valve closes during engine idling when the vacuum in the intake manifold is high. When the PCV valve is closed, the ventilated air and fumes either are blocked off entirely or only small amounts are allowed to pass through an orifice in the PCV valve.

As the engine speeds up, the PCV valve opens to permit larger quantities of air and crankcase fumes to be drawn into the intake manifold, thus increasing the ventilation effect in the crankcase. The PCV valve operates in a puttering manner, rather than smoothly fully opening and closing. While the PCV valve is quite effective in obtaining less ventilation when the engine is idling and more ventilation when the engine is speeded up, the minimal flow through the PCV valve during idling adversely affects engine idling and increases gasoline consumption. The design of the PCV valve is a compromise between good idling and effective burning of the crankcase fumes.

In engines which are not provided with a PCV valve it is still desirable to increase the air flow into the intake manifold downstream of the carburetor, except when the vehicle is idling and the intake manifold vacuum is high. An additional supply of air reduces the amount of vaporized fuel which is drawn through the carburetor and that would be wasted in the vehicle exhaust and would pollute the environment. The richness of the fuel air mixture is preferably reduced. A more correct air-to-fuel ration is assured.

In a vehicle having a PCV valve, the device of the present invention is designed for being positioned in the conduit leading from the PCV valve to downstream side or base of the carburetor. The device acts to permit improved idling characteristics and reduced fuel consumption. In a vehicle engine that pipes crankcase fumes through a PCV valve back to the intake manifold, often there is insufficient oxygen for complete combustion of the gasoline plus the unburned combustible hydrocarbons in the crankcase fumes. The device of the invention helps supply that needed oxygen and also breaks up the unburned hydrocarbons to facilitate their combustion. There are many devices which attempt to solve this problem. Such devices of this general type are disclosed in U.S. Pat. No. 3,809,035; U.S. Pat. No. 3,923,024; and in the previous patents of Juanita Norman U.S. Pat. Nos. 4,183,336 and 4,305,369.

In each of these prior art devices there is a means for opening a passageway to permit ambient air to enter the fuel-air mixture leaving the carburetor under selected low speed conditions and also to suddenly admit large amounts of such air. There has been no attempt in the past to provide a device which will gradually admit more and more ambient air as the speed of the engine is increased, and to reduce that ambient air at still higher speeds. The optimum operation of the device of the present invention is to provide no ambient air at idling conditions and to increase the amount of ambient air as the vehicle speed is increased to about 88 km./hr. and thereafter to decrease the amount of ambient air as the speed is increased to about 113 km./hr. until the ambient air is shut off completely and remains in that condition at still higher speeds. Accordingly it is an object of this invention to provide an improved fuel-air control device. It is still another object of this invention to provide an improved fuel-air control device that provides the optimum amount of ambient air at different speeds of the engine. It is still another object of this invention to provide such a device that is mechanically operated and does not rely upon electronic sensing. Yet another object is to obtain lower exhaust emissions of pollutants from the engine. Still other objects will be apparent from the more detailed description of this invention which follows.

BRIEF SUMMARY OF THE INVENTION

This invention provides a device for aiding in the control of the fuel-air mixture in an internal combustion engine having an accelerator linked mechanically to a carburetor and having a ventilation passage from the crankcase of said engine to the intake manifold, said device comprising:

(a) a valve housing having a seat coupled to an air passage, said air passage adapted for communication between the ambient air and said ventilation passage;

(b) a valve means for seating in said seat to prevent ambient air from flowing into said air passage; and (c) a rotatable valve control cam means coupled to the accelerator linkage to gradually open and close said valve means as the accelerator is depressed. In a preferred embodiment of this invention the valve control cam means is a rotatable plate having a cam surface and said valve means having a roller cam follower urged against the cam surface. In an especially preferred embodiment of this invention the cam surface is an elongated slot positioned adjacent the circumference of the plate with the roller means riding in the slot and attached to the valve body by a yoke, and the rotatable plate having a radial arm attached to the accelerator linkage by a flexible cable.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
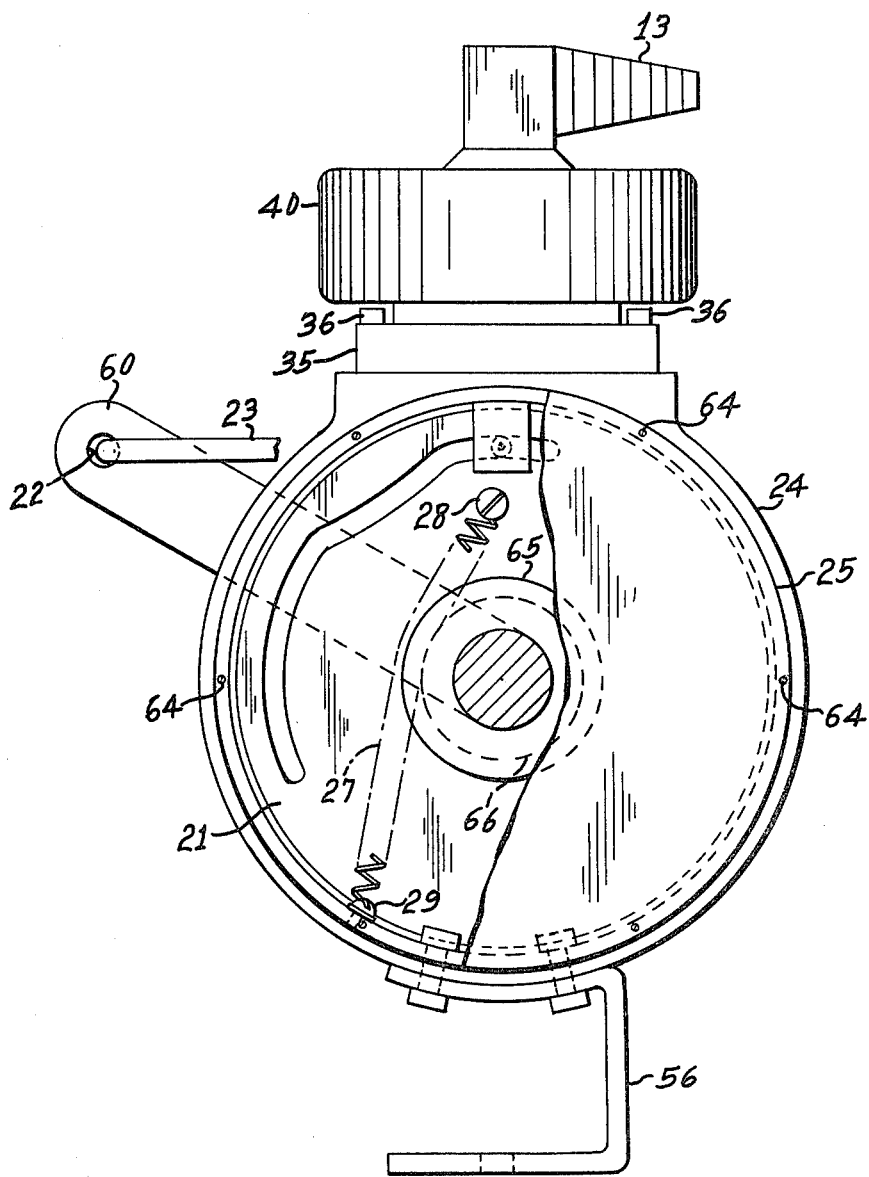
FIG. 1 is a front elevational view of the device of this invention.
Figure 7:
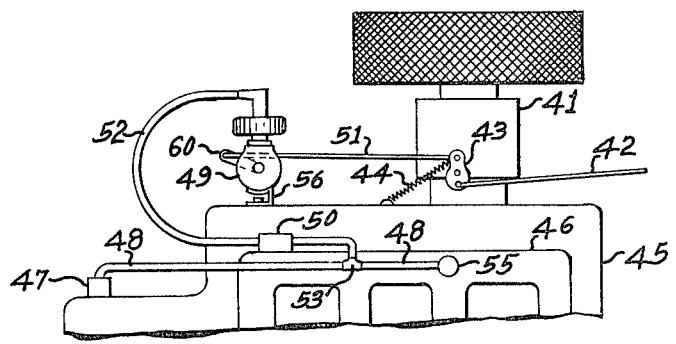
FIG. 7 is a schematic illustration of the device of this invention operatively connected to an internal combustion engine.
Figure 3:
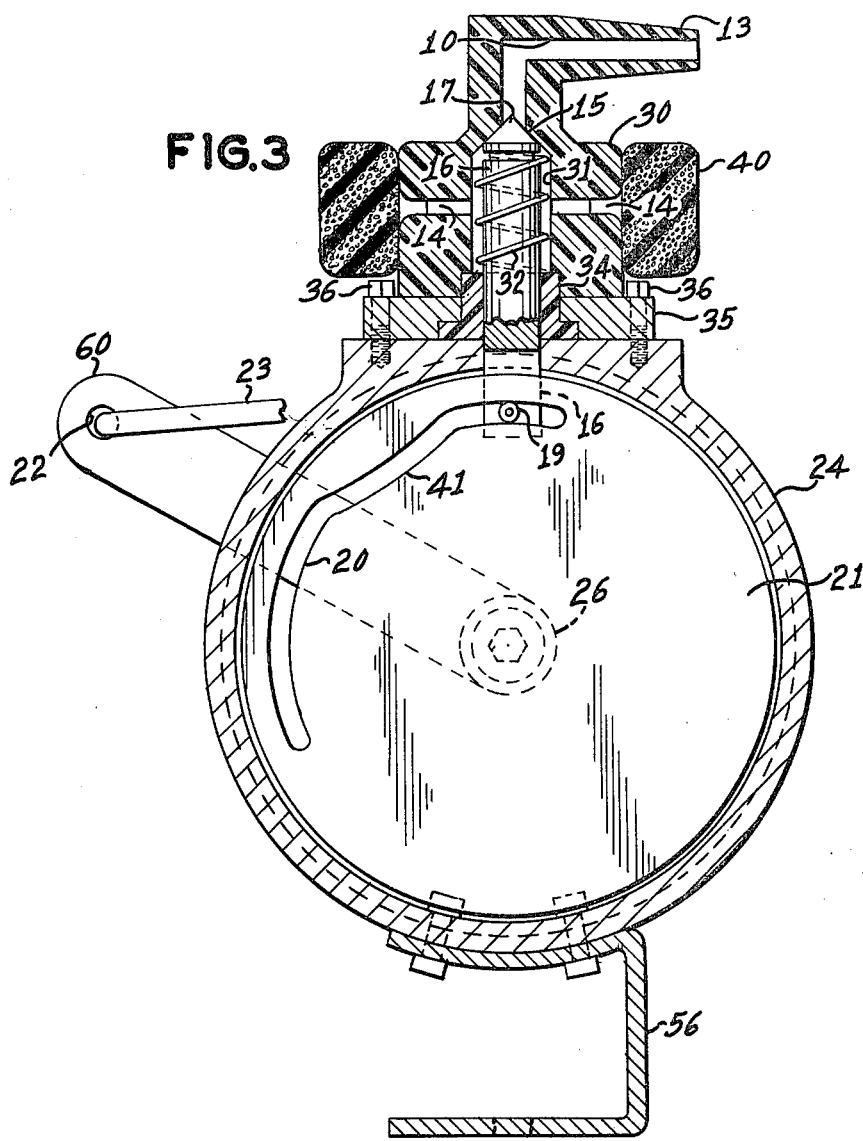
FIG. 3 is a cross sectional view taken at 3—3 of FIG. 2.
Figure 2:
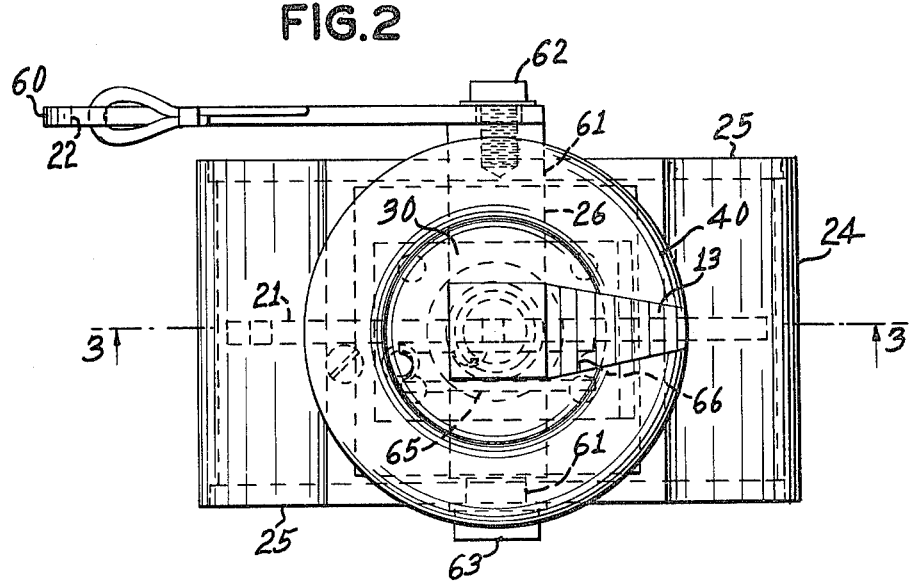
FIG. 2 is a top plan view of the device of this invention.

The device of this invention can be best understood as a complete assembly in FIGS. 1-3 of the drawings. This device is attached to the ventilation passage which joins the crankcase of the engine to the intake manifold. To accomplish this purpose an outlet conduit 10 is connected at 13 to a rubber hose which leads to the ventilation passage connecting the PCV valve to the air intake manifold at the outlet of the carburetor. This attachment is accomplished by cutting the ventilation passage, which normally is a flexible rubber hose, inserting a tee connector and attaching all three hose ends to it as shown in FIG. 7, which will be described more fully below.

The device of this invention comprises a valve housing 30 into which is formed a valve seat 15, which in this instance is a 45° countersunk recess. Connected to valve seat 15 is a vertical bore 31 which is designed to contain a cylindrical valve body 16 having a 45° conical head 17 adapted to mate with seat 15. Inlet passages 14 provide conduits for ambient air outside of the device to enter into bore 31 and to pass through the opening between valve head 17 and valve seat 15 (when the valve is opened) and to conduct that ambient air into outlet conduit 10 and thence into the ventilation passage and on to the intake manifold. When the valve is closed between head 17 and seat 15 ambient air is not admitted into outlet conduit 10. A suitable sponge-like air filter 40 is placed around valve body 30 to prevent dirt from entering passages 14, and may be attached to valve housing 30 by a suitable adhesive. A preferred material for filter 40 is polyurethane foam having pores of about 0.0025 mm. in size.

The components of the device which control the functioning of the valve body 16 are enclosed in a cylindrical housing 24 with two identical removable covers 25 to permit access to the moving parts inside and a bracket 56 for attachment of the device of this invention to a suitable location on an internal combustion engine. Covers 25 are preferably fitted onto housing 24 with a rabbet joint and a suitable number of machine screws 64. Other methods of attachment are also useful. The moving parts of the device comprise a rotatable cam plate 21 which is followed by a roller means 19 on the bottom of valve body 16. Plate 21 is mounted on shaft 26 which is journaled in suitable holes 61 in each of covers 25. The preferred embodiment of the cam surface 20 is a slot passing through plate 21 and having the necessary configuration to permit a roller to be positioned through the slot and attached to valve body 16 by a yoke-containing means for attaching roller 19 firmly to valve body 16.

Plate 21 is moved clockwise by means of flexible cable 23 attached to arm 60 and to the accelerator linkage such that when the accelerator is depressed arm 60 is moved from left to right causing plate 21 to rotate clockwise. Plate 21 is returned to its original position as shown in FIG. 2 by means of spring 27 which is attached at one end to plate 21 by screw 28 and at the other end to housing 24 by screw 29. It will be seen that as plate 21 rotates clockwise from the position shown in FIGS. 1 and 3 roller 19 will pass through a reverse curved portion 41 of cam slot 20 causing valve body 16 gradually to move downwardly and thereby to open the valve to permit ambient air to pass into outlet conduit 10 until at the bottom of reverse curved portion 41 of slot 20 that valve is at its widest open position. As plate 21 is rotated still further clockwise valve body 16 will be urged upwardly until at the end of the reverse curved portion 41 the valve will be closed and no further ambient air will be admitted into outlet conduit 10. As plate 21 rotates still further clockwise slot 20 remains in a position to maintain the valve closed, admitting no ambient air. Plate 21 is fixed, as by welding to shaft 26. At one end of shaft 26 arm 60 is fixedly attached by screw 62 so that arm 60 moves whenever shaft 26 rotates. Any other means of fixing arm 60 to shaft 26 is acceptable, e.g. keyways, welding, etc. The other end of shaft 26 is journaled in respective cover 25 by means of shoulder bolt 63 or other equivalent means. Flexible cable 23 is attached to arm 60 through a suitable hole 22. Flexible cable 23 preferably is a stainless steel cable covered with nylon.

Valve body 16 is mounted in bearing 34 which may be Teflon or other nonlubricated or lubricated bearing material. Bearing 34 is retained in base plate 35 which is attached to housing 24 by suitable bolts 36 or other known fastening means. Encircling valve body 16 is spring 32 which is biased in the direction of maintaining valve head 17 against seat 15 such that the valve is closed when no other forces are operating against valve body 16.

Figure 6:
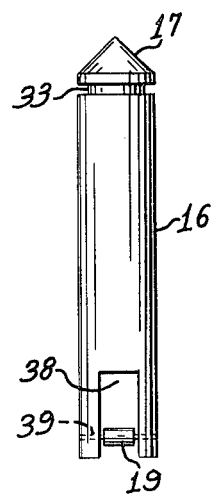
FIG. 6 is a front elevational view of the valve body of the device of this invention.

In FIG. 6 the structure of valve body 16 is seen in more detail as having a conical head 17, a groove 33, and a yoke structure 38. Groove 33 provides a means for securing spring 32 at the end of valve body 16 adjacent head 17. Yoke structure 38 provides a means for attaching valve body 16 to rotatable cam plate 21 and having roller 19 pass completely through slot 20 in plate 21. Roller 19 is preferably made of nylon or other suitable resilient material and is attached to valve body 16 by a suitable central pin shaft 39.

Figure 4:
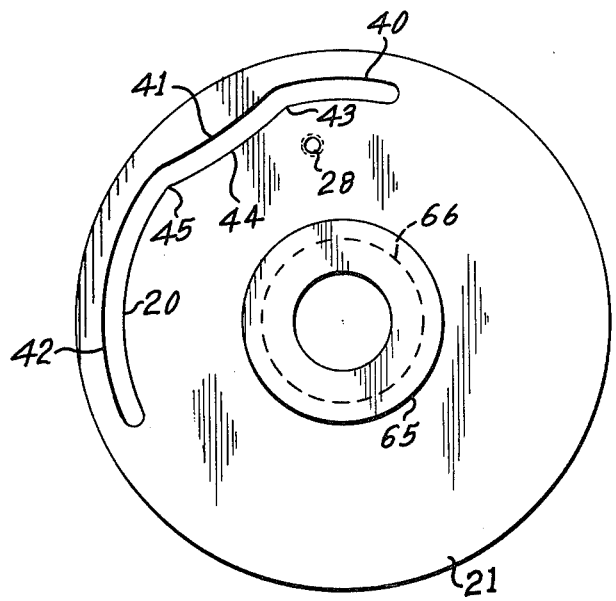
FIG. 4 is a front elevational view of the rotatable plate cam and spring guide of this device.
Figure 5:
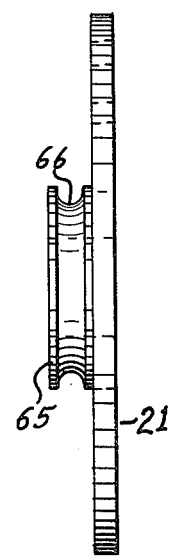
FIG. 5 is an end elevational view of the rotatable plate cam and spring guide of this device.

The structure of cam plate 21 is shown in FIGS. 4 and 5 as a thin circular plate having a suitable cam surface 20 in the form of an arcuate slot passing completely through the plate and extending longitudinally adjacent the circumference of plate for a distance necessary to operate this device. Screw 28 is provided for attachment of one end of spring 27 that returns plate 21 to its position when the engine is idling or not operating. In place of screw 28 there may be used a projecting pin or a hole through plate 21 for attachment of spring 27. In order to retain spring 27 as plate 21 rotates there is provided a guide plate 65 attached to shaft 26 or to plate 21 and having a semicircular groove 66 on its outer perimeter to mate with the outside contour of spring 27.

Cam slot 20 may be conveniently divided into three portions. Portion 40 is designed to maintain the valve in a closed position whereby no ambient air is admitted to the ventilation passage between the PCV valve and the intake minifold. Portion 42 is designed to maintain the valve in the same closed position, and these two portions are essentially arcuate sections concentric with the outer perimeter of plate 21. In between these portions 40 and 42 is reverse curved portion 41 which smoothly connects the two concentric portions with a downwardly directed curved section that is essentially symmetrical about a radius of plate 21 passing through the lowest point of reverse curved portion 41. It will be appreciated that as roller 19 moves downwardly in a smooth gradual manner valve body 16 moves downwardly and permits ambient air to pass into the outlet conduit 10 in an increasing amount until roller 19 reaches the lowermost extent of the curve in portion 41. Beyond this point the roller will move upwardly and gradually close the valve until it reaches the beginning of portion 42 when the valve will be completely closed and will permit no ambient air to pass into outlet conduit 10 at any higher speeds.

In FIG. 7 there is shown how the device of this invention is attached to a typical automotive internal combustion engine. Carburetor 41 sits on top of engine block 45 and is attached to the accelerator through linkage 42 to cam 43. As the accelerator is depressed to increase the engine speed, cam 43 is caused to rotate clockwise increasing the volume of fuel-air mixture from carburetor to intake manifold 46 leading to the cylinders of the engine. Spring 44 is attached to cam 43 to provide a force in the counterclockwise direction so as to return cam 43 to the idling position when the pressure on the accelerator is released. PCV valve 47 is located on the transmission housing and fumes therefrom are conducted through tubing 48 to an inlet fitting 55 on intake manifold 46.

The control device of this invention 49 is mounted on block 45 through an appropriate bracket support 56. Flexible cable 51 is connected to cam 43, the other end being connected to arm 60 of device 49 to cam plate 21 (see FIG. 2). Flexible cable 51 is attached to cam 43 such that as the accelerator is depressed, cable 51 will be pulled outwardly from control device 49, and cam 43 rotates clockwise. The additional ambient air admitted through device 49 as described above is conducted through tubing 52 to a tee fitting 53 and thence into conduit 48 leading to inlet 55 of manifold 46. Since tubing 48 normally is rubber tubing it can be cut at a convenient location, tee 53 inserted therein, and tubing 52 (also normally rubber tubing) attached easily. An added feature of this invention which is preferable, but not necessary in all instances, is the inclusion of valve 50 in tubing 52. Valve 50 performs an added safety function of keeping tubing 52 closed until the engine reaches an acceptable operating temperature. A preferred device for valve 50 is a thermowax switch which is attached to the outside surface of intake manifold 46 and opens tubing 52 when the switch senses a temperature of about 38° C. Another type of device for this purpose is a helical coil switch which performs the same function. Valve 50 is inserted in tubing 52 by cutting the tubing attaching both ends to opposite ports of valve 50 and thereby permitting the flow from tubing 52 to tubing 54 to be unobstructed when the engine is above a minimum operating temperature and to be stopped when the engine temperature is too low.

It has been determined that for optimum operation of the internal combustion engine there should be no ambient air admitted to the ventilation passage when the engine is at low speeds such that the vehicle is moving up to about 56 km./hr. which is represented by point 43 on slot 20. As the vehicle speed is increased ambient air is admitted to the ventilation passage in increasing amounts until the speed reaches about 88 km./hr. which represents point 44 on slot 20. As the speed is increased beyond this point less and less ambient air is needed until the speed reaches about 113 km./hr. represented at point 45, and thereafter at higher speeds no ambient air is admitted to the ventilation passage.

It has been found that in the normal operation of an internal combustion engine which has no fuel-air control device such as that of this invention there will be an air-to-fuel ratio of about 13.2 to 13.5. When the engine of this invention is involved the air-to-fuel ratio is increased through the same range of engine speeds to about 14.2 to about 14.4, thus providing an increased amount of air for total combustion of the fuel and hydrocarbons in the intake manifold.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A device for aiding in the control of the fuel-air mixture in an internal combustion engine having an accelerator linked mechanically to a carburetor and a ventilation passage from the crankcase of said engine to the intake manifold, a valve housing having a seat coupled to an air passage, said air passage adapted for communication between the ambient air and said ventilation passage; and a valve means for seating in said seat to prevent ambient air from flowing into said air passage; wherein the improvement comprises a rotatable valve control cam means mechanically coupled to the accelerator linkage to gradually open said valve means to admit more and more ambient air into said air passage as the engine speed is increased and at still higher engine speeds to gradually close said valve means to admit less and less ambient air into said air passage.

2. The device of claim 1 wherein said valve control cam means is a rotatable plate having a cam surface thereon and said valve means has a roller cam follower urged against said cam surface.

3. The device of claim 2 wherein said rotatable plate is attached to said accelerator linkage by a flexible cable.

4. The device of claim 3 wherein said rotatable plate is attached to a spring urging said plate to rotate in the opposite direction to that produced by said cable.

5. The device of claim 1 wherein said valve means includes an elongated valve body slidable axially toward and away from said seat.

6. The device of claim 5 wherein said seat is a conical and said valve body includes a conical head adapted to mate with said seat.

7. The device of claim 6 wherein said valve body is attached to a spring urging said head into said seat.

8. The device of claim 1 wherein said rotatable valve control cam means is a thin plate rotating about an axis perpendicular to the plate and having an elongated slot positioned adjacent the outer periphery of the plate and said valve means having a yoke attached to the ends of a roller passing through said slot and bearing against the edges of said slot.

9. The device of claim 5 wherein said valve body is a cylindrical member slidably mounted in a bearing.

10. A device for aiding in the control of the fuel-air mixture in an automotive internal combustion engine having a foot operated accelerator connected to a carburetor by mechanical linkage, and having a ventilation passage from the crankcase to the air intake manifold, said device including a valve housing having a conically recessed seat connected to an air passage adapted to be a conduit for ambient air to flow there through into said ventilation passage; and a valve means for operatively mating with said seat to prevent said ambient air from flowing into said air passage; wherein the improvement comprises a rotatable valve control cam means connected to said accelerator linkage to cause said valve means to gradually move from being closed against said seat to be fully open and thereafter to be again closed against said seat as said accelerator is operated to increase the speed of said engine.

11. The device of claim 10 wherein said valve means comprises a cylindrical valve body having a conical head to fit said seat and having roller adapted to bear against and follow said cam means.

12. The device of claim 11 wherein said cam is an elongated arcuate surface on a circular plate rotatable about an axis perpendicular to the plate, said surface being movable at right angles to the axis of said roller.

13. The device of claim 12 wherein said surface is an edge of a slot passing through said plate, and said roller is mounted on a yoke at the lower end of said valve body.

14. The device of claim 12 wherein said rotatable plate has an arm affixed thereto and attached to said accelerator linkage by a flexible cable.

15. The device of claim 14 wherein said plate is attached to a spring biased against rotation of the plate by movement of said cable.

16. The device of claim 11 wherein said valve body is attached to a spring biased to cause seating of said valve means.

17. The device of claim 11 wherein said cam means comprises a circular plate affixed to a central shaft perpendicular to said plate, an arcuate slot on said plate adjacent the outer periphery thereof, and an arm affixed to said shaft, and adapted to rotate about said shaft as said circular plate rotates about that shaft.

* * * * *